(12) United States Patent
Lee

(10) Patent No.: US 12,122,368 B2
(45) Date of Patent: Oct. 22, 2024

(54) APPARATUS FOR COLLISION WARNING AND VEHICLE INCLUDING THE SAME

(71) Applicant: HYUNDAI MOBIS Co., Ltd., Seoul (KR)

(72) Inventor: Dong Pil Lee, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 246 days.

(21) Appl. No.: 17/703,274

(22) Filed: Mar. 24, 2022

(65) Prior Publication Data

US 2023/0003875 A1     Jan. 5, 2023

(30) Foreign Application Priority Data

Jul. 1, 2021   (KR) .................. 10-2021-0086388

(51) Int. Cl.
*B60W 30/09*      (2012.01)
*B60Q 1/08*       (2006.01)
(Continued)

(52) U.S. Cl.
CPC .............. *B60W 30/09* (2013.01); *B60Q 1/08* (2013.01); *B60R 11/04* (2013.01); *B60T 7/12* (2013.01);
(Continued)

(58) Field of Classification Search
CPC ........ B60T 7/12; B60T 7/22; B60T 2201/022; B60W 10/18; B60W 30/09;
(Continued)

(56) References Cited

U.S. PATENT DOCUMENTS 7,986,261 B2 *   7/2011  Harada ............... B60R 21/0134
                                                    342/107
10,829,112 B2 *  11/2020 Ohta ........................ B60T 8/17
(Continued)

FOREIGN PATENT DOCUMENTS

DE    102019215863 A1 *   4/2021
JP       2007-047953 A     2/2007
(Continued)

OTHER PUBLICATIONS

Extended European Search Report issued in corresponding European Patent Application No. 22163333.2 dated Aug. 31, 2022.
(Continued)

*Primary Examiner* — Hung Q Nguyen
*Assistant Examiner* — Mark L. Greene
(74) *Attorney, Agent, or Firm* — MORGAN, LEWIS & BOCKIUS LLP

(57) ABSTRACT

According to an aspect of the present disclosure, a collision warning apparatus of a vehicle may include an information acquisition device that obtains surrounding object information and vehicle information and a controller that generates collision prediction information of a surrounding object based on the surrounding object information and the vehicle information and provides a warning to an outside of the vehicle or generates control information for controlling braking of the vehicle while providing the warning to the outside of the vehicle based on the collision prediction information.

17 Claims, 9 Drawing Sheets

(51) Int. Cl.
- *B60R 11/04* (2006.01)
- *B60T 7/12* (2006.01)
- *B60T 7/22* (2006.01)
- *B60W 10/18* (2012.01)
- *B60W 30/095* (2012.01)
- *G01S 13/931* (2020.01)
- *G01S 17/931* (2020.01)
- *G08G 1/16* (2006.01)

(52) U.S. Cl.
CPC .............. *B60T 7/22* (2013.01); *B60W 10/18* (2013.01); *B60W 30/0953* (2013.01); *B60W 30/0956* (2013.01); *G01S 13/931* (2013.01); *G01S 17/931* (2020.01); *G08G 1/16* (2013.01); *B60T 2201/022* (2013.01); *B60W 2420/403* (2013.01); *B60W 2420/408* (2024.01); *B60W 2554/4029* (2020.02); *B60W 2554/4041* (2020.02); *G01S 2013/93185* (2020.01); *G01S 2013/932* (2020.01); *G01S 2013/9322* (2020.01); *G01S 2013/93271* (2020.01); *G08G 1/166* (2013.01)

(58) Field of Classification Search
CPC ......... B60W 30/0953; B60W 30/0956; B60W 2420/403; B60W 2420/408; B60W 2554/4029; B60W 2554/4041; G01S 13/931; G01S 17/931; G01S 2013/93185
See application file for complete search history.

(56) References Cited

U.S. PATENT DOCUMENTS

| | | | |
|---|---|---|---|
| 2015/0329043 A1* | 11/2015 | Skvarce | B60W 30/085 340/435 |
| 2016/0075332 A1 | 3/2016 | Edo-Ros | |
| 2018/0118106 A1 | 5/2018 | You et al. | |
| 2018/0162388 A1 | 6/2018 | You et al. | |
| 2018/0233048 A1 | 8/2018 | Andersson et al. | |
| 2019/0180624 A1 | 6/2019 | Hassan-Shafique et al. | |
| 2020/0139963 A1* | 5/2020 | Kim | B60W 10/20 |

FOREIGN PATENT DOCUMENTS

| | | |
|---|---|---|
| JP | 2008171276 A * | 7/2008 |
| JP | WO2010/086895 A1 | 7/2012 |
| JP | 2015-141553 A | 8/2015 |
| JP | 2020-190148 A | 11/2020 |

OTHER PUBLICATIONS

Office Action issued in corresponding Korean Patent Application No. 10-2021-0086388 dated Jan. 18, 2023.

* cited by examiner

APPARATUS FOR COLLISION WARNING AND VEHICLE INCLUDING THE SAME

CROSS-REFERENCE TO RELATED APPLICATION

This application claims the benefit of priority to Korean Patent Application No. 10-2021-0086388, filed in the Korean Intellectual Property Office on Jul. 1, 2021, the entire contents of which are incorporated herein by reference.

TECHNICAL FIELD

The present disclosure relates to a collision warning apparatus and a vehicle including the same.

BACKGROUND

Vehicles equipped with an autonomous driving technology employ a collision avoidance system for preventing collisions between a vehicle and other objects such as pedestrians or cyclists on a road.

A conventional collision avoidance system prevents collisions between vehicles and pedestrians or cyclists, by providing a vehicle driver with a warning sound, the vibration of a steering wheel, or a warning pop-up, or by providing the vehicle driver with vehicle braking or evasive steering.

However, this collision avoidance system may not prevent a collision accident (i.e., a collision accident due to unexpected pedestrian movement) caused by careless pedestrians. In addition, it is impossible to prevent a collision accident due to a pedestrian's avoidance by providing the pedestrian with a warning in advance.

SUMMARY

The present disclosure has been made to solve the above-mentioned problems occurring in the prior art while advantages achieved by, the prior art are maintained intact.

An aspect of the present disclosure provides a collision warning apparatus that may prevent collision accidents in advance by providing a warning to pedestrians and may provide a warning classified depending on a collision risk, and a vehicle including the same.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, a collision warning apparatus of a vehicle may include an information acquisition device that obtains surrounding object information and vehicle information and a controller that generates collision prediction information of a surrounding object based on the surrounding object information and the vehicle information and provides a warning to an outside of the vehicle or generates control information for controlling braking of the vehicle while providing the warning to the outside of the vehicle based on the collision prediction information.

According to an embodiment, the surrounding object information may include a relative location of the surrounding object and a relative velocity of the surrounding object with respect to a location and a velocity of the vehicle, respectively. The vehicle information may include a size of the vehicle and an angular velocity of the vehicle.

According to an embodiment, the information acquisition device may detect the surrounding object in front of the vehicle by using a vehicle front camera, and may detect the relative location of the surrounding object and the relative velocity of the surrounding object by using a radar or a lidar.

According to an embodiment, the collision prediction information may include a collision prediction location of the surrounding object, a time to collision of the surrounding object, and a collision risk of the surrounding object.

According to an embodiment, the controller may predict the collision prediction location based on the relative location and the relative velocity, may predict the time to collision based on the relative location and an angle between the vehicle and the surrounding object, and may predict the collision risk based on the collision prediction location.

According to an embodiment, the controller may provide the warning to the outside of the vehicle or may generate the control information for controlling the braking of the vehicle while providing to the outside of the vehicle, when the collision prediction location is within a threshold range from the vehicle.

According to an embodiment, the controller may generate control information for providing a warning to the outside of the vehicle, when the collision risk is less than a first value and a reciprocal of the time to collision exceeds a first threshold time.

According to an embodiment, the controller may generate the control information for controlling the braking of the vehicle while providing the warning to the outside of the vehicle when the collision risk is less than a second value and a reciprocal of the time to collision exceeds a second threshold time.

According to an embodiment, the controller may generate control information for braking the vehicle, when the collision risk is not less than a second value and is less than a first value and a reciprocal of the time to collision exceeds a second threshold time.

According to an embodiment, the warning provided to the outside of the vehicle may include at least one of a horn or a headlight beam.

According to an aspect of the present disclosure, a vehicle may include an interface that receives a warning mode of the vehicle, a collision warning apparatus that obtains surrounding object information and vehicle information and generates collision prediction information of a surrounding object based on the surrounding object information and the vehicle information, and a vehicle controller that provides a warning to an outside of the vehicle or controls braking of the vehicle while providing the warning to the outside of the vehicle based on the collision prediction information and the warning mode received through the interface.

According to an embodiment, the surrounding object information may include a relative location of the surrounding object and a relative velocity of the surrounding object with respect to a location and a velocity of the vehicle, respectively. The vehicle information may include a size of the vehicle and an angular velocity of the vehicle.

According to an embodiment, the collision prediction information may include a collision prediction location of the surrounding object, a time to collision of the surrounding object, and a collision risk of the surrounding object.

According to an embodiment, the warning mode may include at least one of a warning time point, whether an external warning of the vehicle is present, or whether the vehicle is braked.

According to an embodiment, the collision warning apparatus may predict the collision prediction location based on the relative location and the relative velocity, may predict the time to collision based on the relative location and an angle between the vehicle and the surrounding object, and may predict the collision risk based on the collision prediction location.

According to an embodiment, the vehicle controller may provide the warning to the outside of the vehicle or may control the braking of the vehicle while providing the warning to the outside of the vehicle when the warning mode includes execution of an external warning of the vehicle and execution of the braking of the vehicle, and the collision prediction location is within a threshold range from the vehicle.

According to an embodiment, the vehicle controller may provide the warning to the outside of the vehicle, when the collision risk is less than a first value and a reciprocal of the time to collision exceeds a first threshold time.

According to an embodiment, the vehicle controller may control the braking of the vehicle while providing the warning to the outside of the vehicle when the collision risk is less than a second value and a reciprocal of the time to collision exceeds a second threshold time.

According to an embodiment, the vehicle controller may brake the vehicle, when the collision risk is not less than a second value and is less than a first value and a reciprocal of the time to collision exceeds a second threshold time.

According to an embodiment, the warning provided to the outside of the vehicle may include at least one of a horn or a headlight beam.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
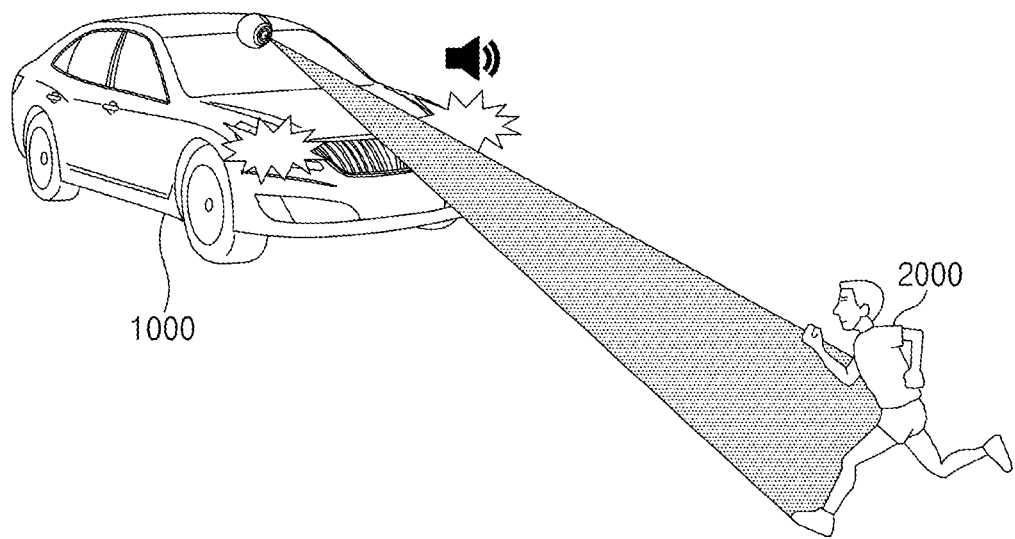
FIG. 1 is a view for describing generally a vehicle, according to an embodiment of the present disclosure.

Hereinafter, exemplary embodiments of the present disclosure will be described in detail with reference to the accompanying drawings. In adding reference numerals to components of each drawing, it should be noted that the same components have the same reference numerals, although they are indicated on another drawing. In describing the embodiments of the present disclosure, detailed descriptions associated with well-known functions or configurations will be omitted when they may make subject matters of the present disclosure unnecessarily obscure.

In describing elements of exemplary embodiments of the present disclosure, the terms first, second, A, B, (a), (b), and the like may be used herein. These terms are only used to distinguish one element from another element, but do not limit the corresponding elements irrespective of the nature, order, or priority of the corresponding elements. Furthermore, unless otherwise defined, all terms including technical and scientific terms used herein are to be interpreted as is customary in the art to which the present disclosure belongs. It will be understood that terms used herein should be interpreted as having a meaning that is consistent with their meaning in the context of the present disclosure and the relevant art and will not be interpreted in an idealized or overly formal sense unless expressly so defined herein.

Figure 2:
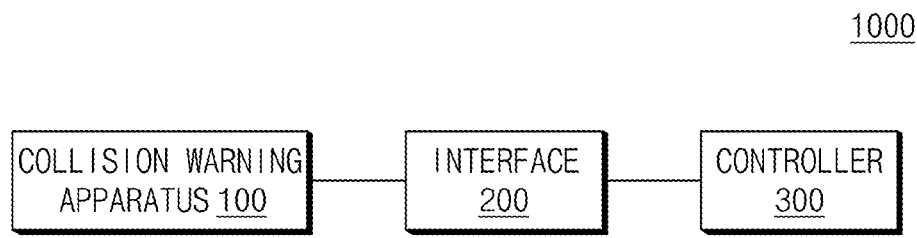
FIG. 2 is a block diagram illustrating a configuration of a vehicle, according to an embodiment of the present disclosure.

FIG. 1 is a view for describing generally a vehicle, according to an embodiment of the present disclosure. FIG. 2 is a block diagram illustrating a configuration of a vehicle, according to an embodiment of the present disclosure.

Hereinafter, referring to FIGS. 1 and 2, the configuration and operation of a vehicle 1000 will be described.

Referring to FIG. 1, the vehicle 1000 may be defined as an apparatus equipped with an autonomous driving technology that analyzes a collision risk between the vehicle 1000 and a surrounding object 2000 in front of the vehicle 1000 and provides a warning to pedestrians or brakes a vehicle based on the analysis result.

Herein, the surrounding object 2000 may include, for example, a vulnerable road user (VRU) located in front of the vehicle 1000. The VRU may include a pedestrian or cyclist located on a road. The surrounding object 2000 may include an object capable of changing a moving direction or moving speed under the influence of the vehicle 1000 or the environment surrounding the vehicle.

Referring to FIG. 2, the vehicle 1000 may include a collision warning apparatus 100, an interface 200, and a controller 300.

The collision warning apparatus 100 may recognize the surrounding object 2000 in front, and then may analyze the collision risk between the vehicle 1000 and the surrounding object 2000. For example, the collision warning apparatus 100 may generate collision prediction information of the surrounding object 2000 and then may provide a warning to the outside of the vehicle based on the collision prediction information; alternatively, while providing a warning outside the vehicle, the collision warning apparatus 100 may generate control information for controlling the braking of the vehicle.

The collision warning apparatus 100 may obtain object information of the surrounding object 2000 and vehicle information. Herein, the object information may include a relative location and relative velocity of the surrounding object 2000. The vehicle information may include a size and angular velocity of the vehicle 1000.

The collision warning apparatus 100 may generate the collision prediction information of the surrounding object

2000, based on the obtained vehicle information and the obtained object information of the surrounding object 2000.

In detail, the collision warning apparatus 100 may generate a collision prediction location ($y_{pred}$), a time to collision ($TTC_{Radial}$), and a collision risk ($\gamma_{index}$) of the surrounding object 2000, based on the relative location of the surrounding object 2000, the relative velocity of the surrounding object 2000, and the size and angular velocity of the vehicle 1000.

The collision warning apparatus 100 may predict the collision prediction location ($y_{pred}$) of the surrounding object 2000 based on the relative location and relative velocity of the surrounding object 2000.

Furthermore, the collision warning apparatus 100 may predict time to collision ($TTC_{Radial}$) based on the relative location of the surrounding object 2000 and an angle between the vehicle 1000 and the surrounding object 2000, and then may calculate a reciprocal ($TTC_{Radial}^{-1}$) of time to collision based on time to collision ($TTC_{Radial}$).

Moreover, the collision warning apparatus 100 may predict a collision risk ($\gamma_{index}$) based on the collision prediction location ($y_{pred}$) of the surrounding object 2000.

On the basis of the collision prediction location ($y_{pred}$), the reciprocal ($TTC_{Radial}^{-1}$) of time to collision, and the collision risk ($\gamma_{index}$), the collision warning apparatus 100 may provide a warning to the surrounding object 2000, or may generate control information for controlling the braking of the vehicle 1000 while providing a warning to the surrounding object 2000.

The interface 200 may receive a warning mode of the vehicle 1000 from a user and may deliver information about the received warning mode. That is, the interface 200 may be a connection device or a communication device that connects the user to the vehicle 1000. For example, the interface 200 may be a hardware device implemented by various electronic circuits, e.g., processor, transceiver, etc., to transmit and receive signals via wireless or wired connections.

The interface 200 may receive the warning mode of the vehicle 1000 from the user. Herein, the warning mode may include at least one of a warning time point, whether an external warning of the vehicle 1000 is present, or whether the vehicle 1000 is braked.

The warning time point may include, for example, an early mode, a normal mode or a late mode. Whether an external warning of the vehicle 1000 is present may include at least one of an external horn on mode, an external horn off mode, an external lamp on mode, or an external lamp off mode. Whether the vehicle 1000 is braked may include a braking off mode or a braking on mode.

The controller 300 may include an electronic control unit (ECU) of a vehicle that performs vehicle communication with the collision warning apparatus 100 through the interface 200 and then sets whether to generate a warning or whether to brake the vehicle 1000.

On the basis of the control information obtained from the collision warning apparatus 100 and the warning mode input through the interface 200, the controller 300 may provide a warning to the outside of the vehicle 1000, or may control the braking of the vehicle 1000 while providing a warning to the outside of the vehicle 1000. For example, the control information obtained from the collision warning apparatus 100 may be information generated based on the collision prediction information. Herein, the warning provided to the outside of the vehicle 1000 may include at least one of a horn or a headlight beam.

For example, when the warning mode received through the interface 200 includes at least one of the external horn on mode or the external lamp on mode, and the collision prediction location is within a threshold range, the controller 300 may provide a warning to the outside of the vehicle 1000.

For example, when the warning mode received through the interface 200 includes at least one of the external horn on mode or the external lamp on mode, and includes the braking on mode, and when the collision prediction location is within the threshold range, the controller 300 may control braking of the vehicle 1000 while providing a warning to the outside of the vehicle 1000.

In detail, on the basis of the collision prediction location ($y_{pred}$), the reciprocal ($TTC_{Radial}^{-1}$) of time to collision and the collision risk ($\gamma_{index}$), the controller 300 may provide a warning to the surrounding object 2000 or may control the braking of the vehicle 1000 while providing a warning to the surrounding object 2000.

When the collision risk ($\gamma_{index}$) is less than a first value, and the reciprocal ($TTC_{Radial}^{-1}$) of time to collision exceeds a first threshold time, the controller 300 may provide a warning to the outside of the vehicle 1000. Herein, the first value may include $\gamma_2$. The first threshold time may be a reference time that is a criterion for whether to provide a warning to the outside of the vehicle 1000.

When the collision risk ($\gamma_{index}$) is less than a second value and the reciprocal ($TTC_{Radial}^{-1}$) of time to collision exceeds a second threshold time, the controller 300 may partially control braking of the vehicle 1000 while providing a warning to the outside of the vehicle 1000. Herein, the second value may include $\gamma_1$. The second threshold time may be a reference time that is a criterion for whether to provide braking of the vehicle 1000.

Figure 3:
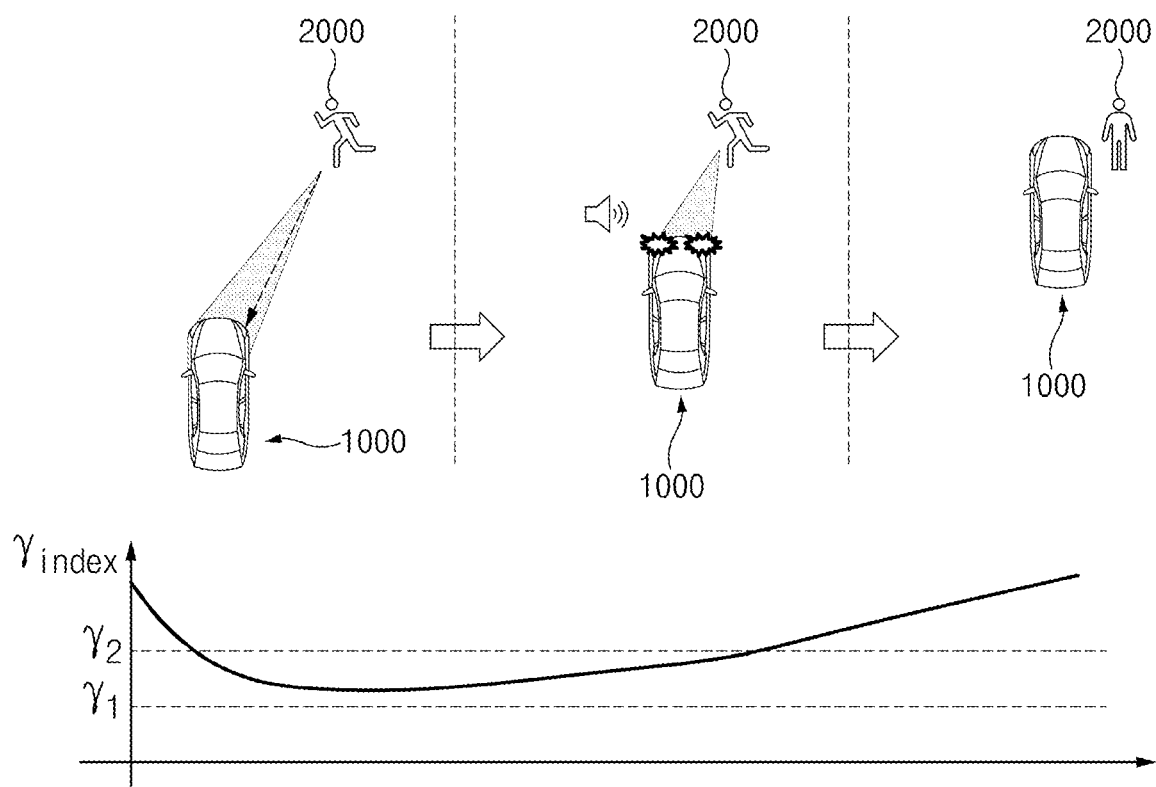
FIG. 3 is a view for describing an operation of a surrounding object according to a collision warning of a vehicle, according to an embodiment of the present disclosure.

FIG. 3 is a view for describing an operation of a surrounding object according to a collision warning of a vehicle, according to an embodiment of the present disclosure.

Referring to FIG. 3, when the collision risk ($\gamma_{index}$) of the surrounding object 2000 is not less than the second value and less than the first value, the controller 300 of the vehicle 1000 may provide a warning to the outside of the vehicle 1000 and may partially control braking of the vehicle 1000. The vehicle 1000 may be designed to perform avoidance driving due to external warnings and partial braking, for the purpose of avoiding a collision.

When the collision risk ($\gamma_{index}$) is less than the second value, and the reciprocal ($TTC_{Radial}^{-1}$) of time to collision exceeds a second threshold time, the controller 300 may fully brake the vehicle 1000. Herein, the second value may include $\gamma_1$. Besides, the second threshold time may be a reference time that is a criterion for whether to provide braking of the vehicle 1000.

Figure 4:
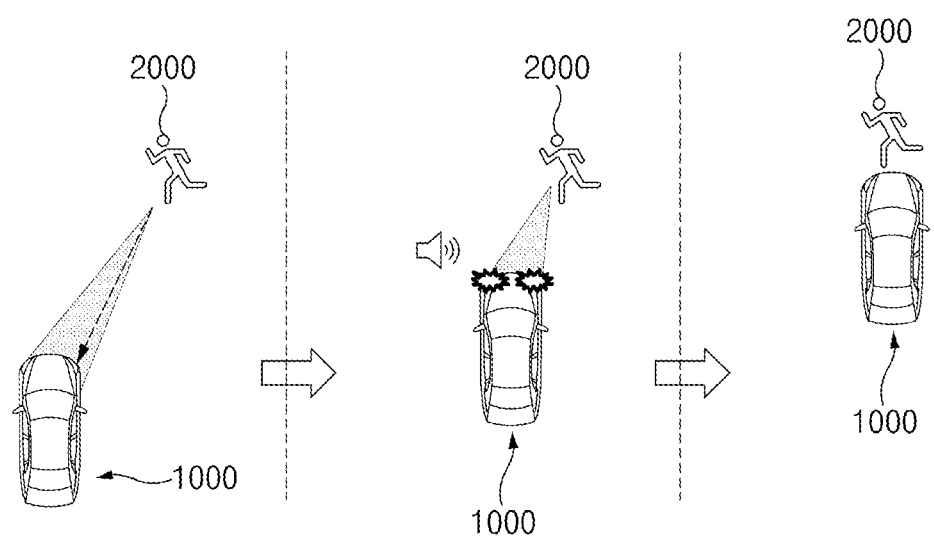
FIG. 4 is a view for describing an operation of a surrounding object according to a collision warning of a vehicle, according to another embodiment of the present disclosure.
Figure 4:
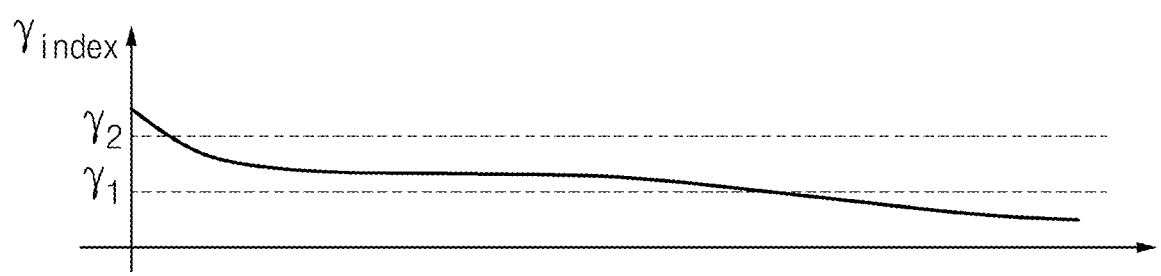

FIG. 4 is a view for describing an operation of a surrounding object according to a collision warning of a vehicle, according to another embodiment of the present disclosure.

Referring to FIG. 4, when the collision risk ($\gamma_{index}$) of the surrounding object 2000 is not less than the second value and less than the first value, the controller 300 of the vehicle 1000 may partially control braking of the vehicle 1000 while providing a warning to the outside of the vehicle 1000. After the avoidance driving due to external warnings and partial braking is designed, when the collision risk ($\gamma_{index}$) of the surrounding object 2000 is less than the second value, the vehicle 1000 may brake the vehicle 1000 to prevent a collision.

Hereinafter, a configuration and operation of the collision warning apparatus 100, which generates the collision prediction location, time to collision, and collision risk of the surrounding object 2000 will be described in detail with reference to FIG. 5.

Figure 5:
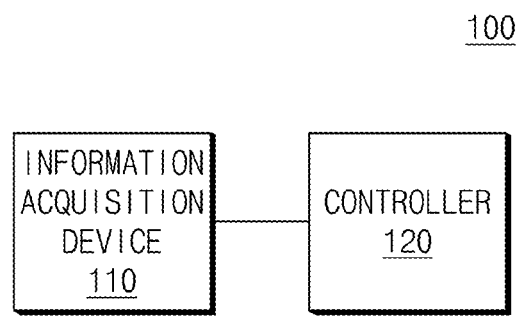
FIG. 5 is a block diagram illustrating a configuration of a collision warning apparatus, according to an embodiment of the present disclosure.

FIG. 5 is a block diagram illustrating a configuration of a collision warning apparatus, according to an embodiment of the present disclosure.

Referring to FIG. 5, the collision warning apparatus 100 may include an information acquisition device 110 and a controller 120.

The information acquisition device 110 may obtain vehicle information and information of the surrounding object 2000. The information acquisition device 110 may be a sensor (e.g., camera, radar, lidar, etc.) or a processor that is implemented by a non-transitory memory and programmed to perform information acquisition functions.

For example, the information acquisition device 110 may detect the surrounding object 2000 in front of the vehicle 1000 by using a front camera of the vehicle 1000.

Furthermore, for example, the information acquisition device 110 may detect the relative location and relative velocity of the surrounding object 2000 by using a radar or a lidar. For example, the radar may obtain a distance to the surrounding object 2000. The radar may transmit a transmission electromagnetic wave signal to the surrounding object 2000 detected through the front camera, and then may receive reception electromagnetic waves reflected from the surrounding object 2000. The radar may obtain a distance to the surrounding object 2000, the relative location of the surrounding object 2000, and the relative velocity of the surrounding object 2000 by using a Doppler frequency change and a time difference between a transmission electromagnetic wave and a reception electromagnetic wave.

The controller 120 may generate collision prediction information of the surrounding object 2000 based on vehicle information and information of the surrounding object 2000 obtained by the information acquisition device 110. In detail, the controller 120 may generate a collision prediction location ($y_{pred}$), a time to collision ($TTC_{Radial}$), and a collision risk ($\gamma_{index}$) of the surrounding object 2000, based on the relative location of the surrounding object 2000, the relative velocity of the surrounding object 2000, and the size and angular velocity of the vehicle 1000.

On the basis of the collision prediction information, the controller 120 may provide a warning to the outside of the vehicle 1000, or may generate control information for controlling the braking of the vehicle 1000 while providing a warning to the outside of the vehicle 1000. The controller 120 may deliver the control information to the controller 300.

Hereinafter, it will be described that the controller 120 predicts a collision prediction location of the surrounding object 2000 based on a relative location and relative velocity of the surrounding object 2000.

Figure 6:
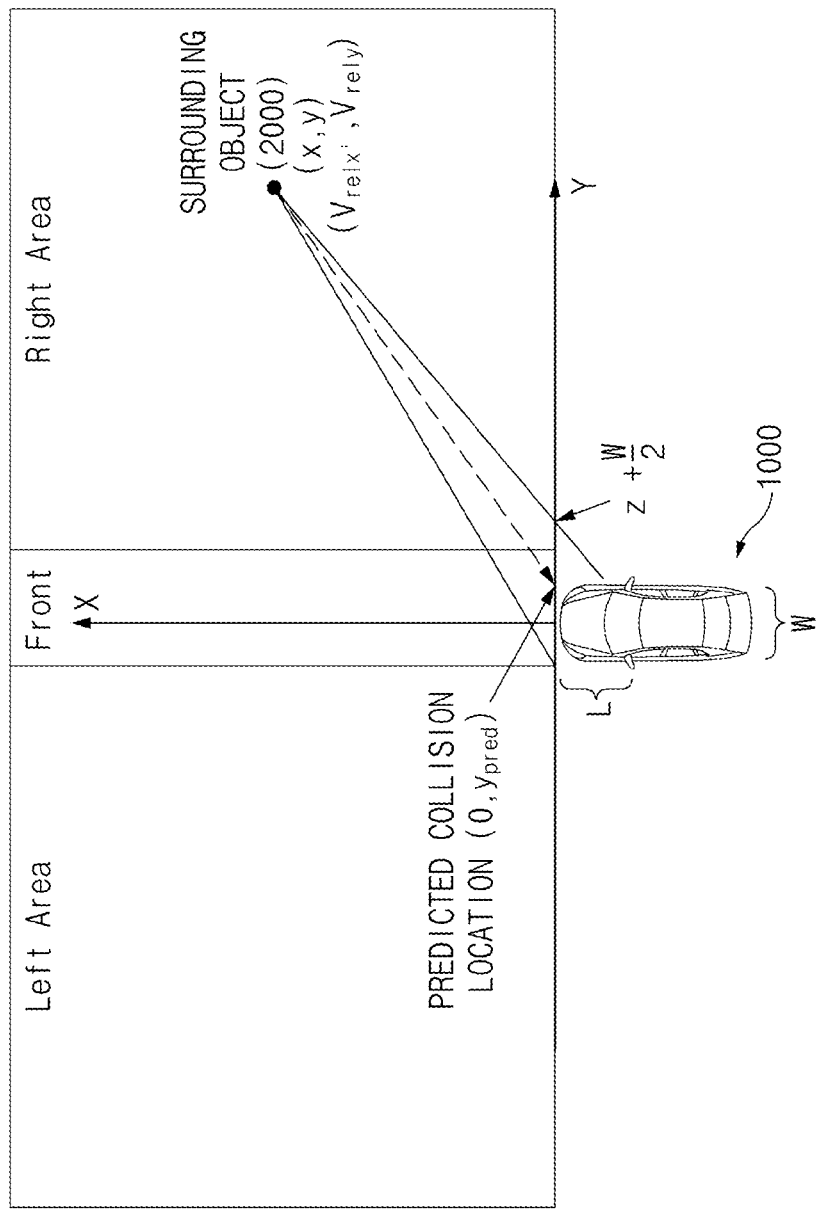
FIG. 6 is a view for describing that a collision warning apparatus predicts a collision prediction location, according to an embodiment of the present disclosure.

FIG. 6 is a view for describing that a collision warning apparatus predicts a collision prediction location, according to an embodiment of the present disclosure.

Referring to FIG. 6, the controller 120 may calculate a collision prediction location ($y_{pred}$) of the surrounding object 2000 based on Equation 1.

$$y_{pred} = y - \frac{V_{rely}}{V_{relx}} \cdot x \qquad \text{[Equation 1]}$$

In Equation 1, (x, y) denotes a relative location of the surrounding object 2000; ($V_{relx}$, $V_{rely}$) denotes a relative velocity of the surrounding object 2000; and, "$y_{pred}$" denotes a collision prediction location.

When the collision prediction location ($y_{pred}$) of the surrounding object 2000 is included in a threshold range, the controller 120 may determine that the surrounding object 2000 is in danger of collision with the vehicle 1000.

Herein, the controller 120 may differently set a threshold range depending on whether the surrounding object 2000 is located on one of the front, left or right side of the vehicle 1000. The threshold range may be divided into a left threshold and a right threshold of the vehicle 1000. That is, when the surrounding object 2000 is positioned between the left threshold and the right threshold of the vehicle 1000, the controller 120 may determine that the surrounding object 2000 is in danger of collision with the vehicle 1000.

The controller 120 may calculate the threshold range based on Equation 2 below.

$$z = \frac{L\left(|y| - \frac{w}{2}\right)}{w(x + L)} \qquad \text{[Equation 2]}$$

$$z(x, y) = \begin{cases} -z, & y < 0 \\ z, & y \geq 0 \end{cases}$$

When the surrounding object 2000 is positioned on a left side of the vehicle 1000, left threshold=−W/2, and right threshold=z(x, y)+W/2.

When the surrounding object 2000 is positioned on a right side of the vehicle 1000, left threshold=z(x, y)−(W/2), and right threshold=W/2.

When the surrounding object 2000 is located in front of the vehicle 1000, left threshold=−W/2, and right threshold=W/2.

In Equation 2, (x, y) denotes a relative location of the surrounding object 2000; ($V_{relx}$, $V_{rely}$) denotes a relative velocity of the surrounding object 2000; 'w' denotes a width of the vehicle 1000; and 'L' denotes a distance from a front end of the vehicle 1000 to an A-pillar of the vehicle 1000.

Herein, z(x, y) may be defined as a variable used to determine whether the collision prediction location ($y_{pred}$) of the surrounding object 2000 is within a threshold range of the surrounding object 2000. The controller 120 may determine whether the collision prediction location ($y_{pred}$) of the surrounding object 2000 is within the threshold range of the surrounding object 2000, based on z(x, y).

Hereinafter, it is described that the controller 120 predicts the time to collision ($TTC_{Radial}$) based on a relative location of the surrounding object 2000 and an angle between the vehicle 1000 and the surrounding object 2000.

Figure 7:
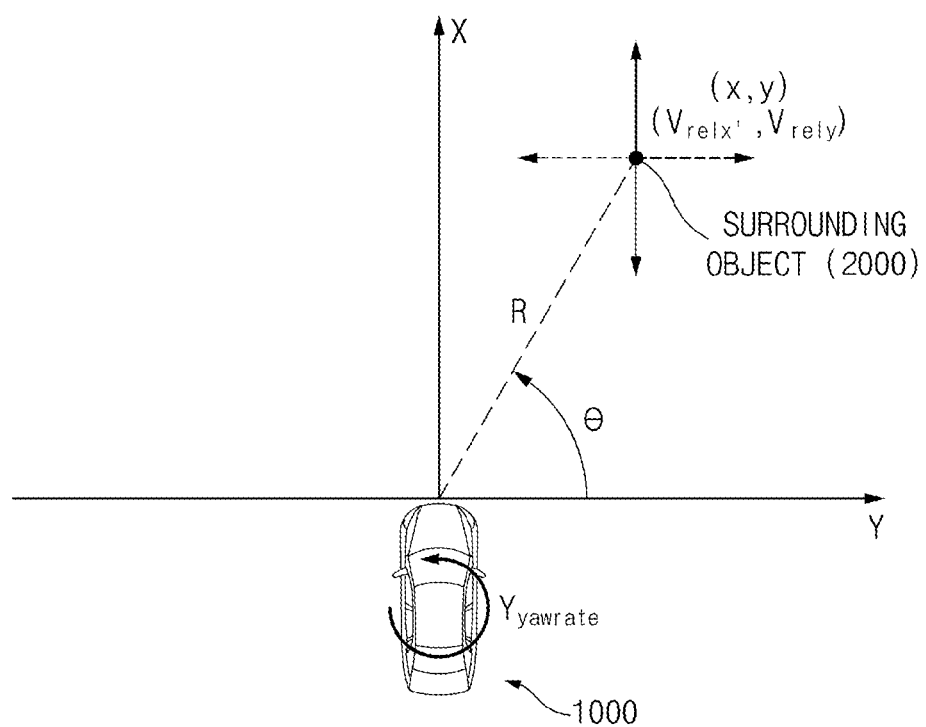
FIG. 7 is a view for describing that a collision warning apparatus predicts a time to collision, according to an embodiment of the present disclosure.
Figure 8:
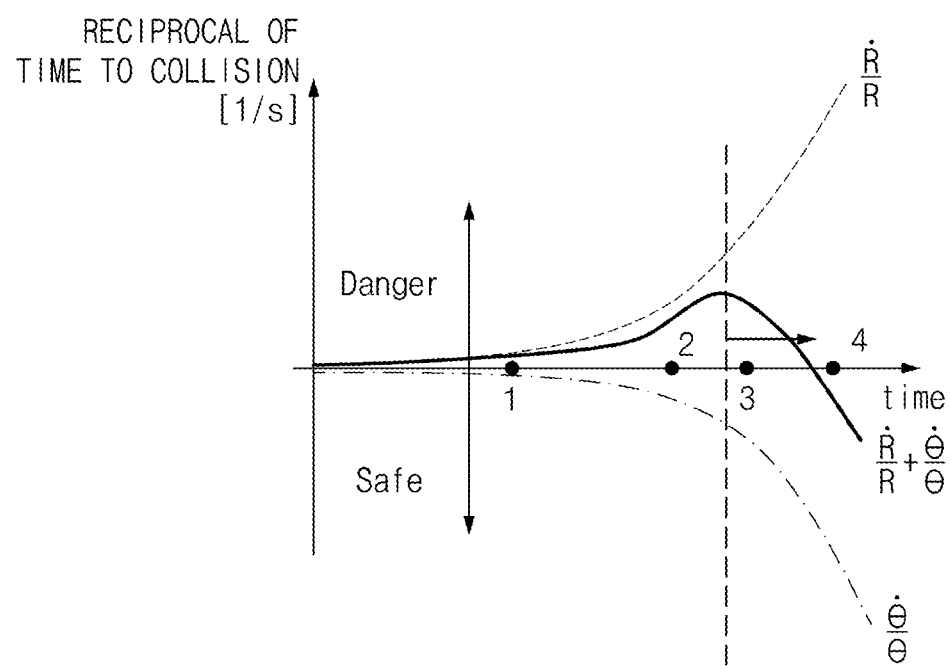
FIG. 8 is a diagram for describing a reciprocal of time to collision, according to an embodiment of the present disclosure.

FIG. 7 is a view for describing that a collision warning apparatus predicts a time to collision, according to an embodiment of the present disclosure. FIG. 8 is a diagram for describing a reciprocal of time to collision, according to an embodiment of the present disclosure.

First of all, referring to FIG. 7, the controller 120 may calculate a reciprocal of time to collision based on a relative location (x, y) of the surrounding object 2000, a relative velocity ($V_{relx}$, $V_{rely}$) of the surrounding object 2000, an angular velocity ($\gamma_{yawrate}$) of the vehicle 1000, and an angle (θ) between the surrounding object 2000 and the vehicle 1000. That is, the controller 120 may calculate the reciprocal ($TTC_{Radial}^{-1}$) of time to collision, which reflects the angular velocity ($\gamma_{yawrate}$) of the vehicle 1000 and the lateral movement of the surrounding object 2000, by using the angular velocity ($\gamma_{yawrate}$) of the vehicle 1000 and the angle (θ) between the surrounding object 2000 and the vehicle 1000 that is radial information.

The controller 120 may calculate the reciprocal ($TTC_{Radial}^{-1}$) of time to collision based on Equation 3 below.

$$\dot{R} = \frac{x\dot{x} + y\dot{y}}{\sqrt{x^2 + y^2}}$$

$$\dot{\theta} = \frac{x\dot{y} - \dot{x}y}{x^2 + y^2}$$

$$\dot{x} = v_{relx} - \gamma_{yawrate} \cdot y$$

$$\dot{y} = v_{rely} + \gamma_{yawrate} \cdot x$$

$$TTC_{Radial}^{-1} = \frac{\dot{R}}{R} + \frac{\dot{\theta}}{\theta}$$

[Equation 3]

In Equation 3, R denotes a value obtained by differentiating a distance R between the vehicle 1000 and the surrounding object 2000; (x, y) denotes a relative location of the surrounding object 2000; ($V_{relx}$, $V_{rely}$) denotes a relative velocity of the surrounding object 2000; "$\gamma_{yawrate}$" denotes an angular velocity of the vehicle 1000; and, 'θ' denotes an angle between the surrounding object 2000 and the vehicle 1000.

FIG. 8 is a graph illustrating a relationship between time and a reciprocal ($TTC_{radial}^{-1}$) of time to collision. In FIG. 8, point '1', '2' or '3' on the time axis is a point where the reciprocal ($TTC_{Radial}^{-1}$) of time to collision belongs to a danger area; and, point '4' on the time axis is a point where the reciprocal ($TTC_{Radial}^{-1}$) of time to collision belongs to a safe area.

That is, point '1', '2' or '3' on the time axis correspond to a case that the reciprocal ($TTC_{Radial}^{-1}$) of time to collision exceeds a reference value based on a specific reference value. Because the time to collision is shorter than the reference time, the collision risk between the vehicle 1000 and the surrounding object 2000 may be high.

That is, point '4' on the time axis correspond to a case that the reciprocal ($TTC_{Radial}^{-1}$) of time to collision less than the reference value based on the specific reference value. Because the time to collision is longer than the reference time, the collision risk between the vehicle 1000 and the surrounding object 2000 may be low.

Furthermore, the controller 120 may predict a collision risk ($\gamma_{index}$) based on the collision prediction location ($y_{pred}$) of the surrounding object 2000.

The controller 120 may calculate the collision risk ($\gamma_{index}$) of the surrounding object 2000 based on Equation 4 below.

$$r_{index} = \frac{1}{a} y_{pred}^2 + \frac{1}{b} \dot{y}_{pred} \cdot y_{pred}$$

In Equation 4, '$y_{pred}$' denotes a collision prediction location of the surrounding object 2000; $\dot{y}_{pred}$ denotes a value obtained by differentiating $y_{pred}$ with respect to a time; and, 'a' and 'b' denote tuning variables. The controller 120 may calculate the collision risk ($\gamma_{index}$) by using a quadratic function of the collision prediction location ($y_{pred}$) of the surrounding object 2000.

Figure 9:
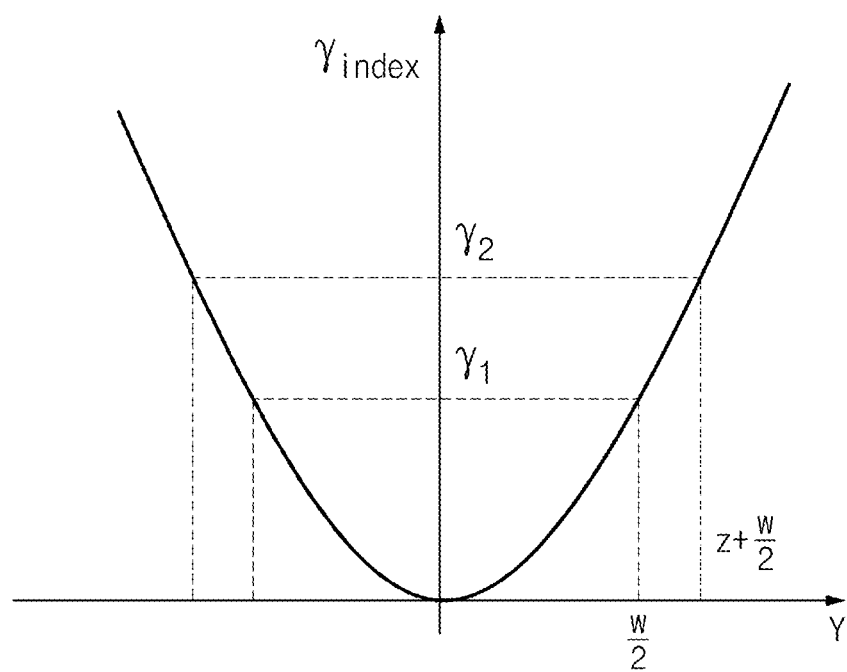
FIG. 9 is a graph for describing a collision risk according to a collision prediction location, according to an embodiment of the present disclosure.

FIG. 9 is a graph for describing a collision risk according to a collision prediction location, according to an embodiment of the present disclosure. In detail, FIG. 9 is a graph illustrating a collision risk ($\gamma_{index}$) when $\dot{y}_{pred}$ is 0 in Equation 4.

In FIG. 9, when the y-coordinate of the surrounding object 2000, which is a relative location, is w/2, a collision risk ($\gamma_{index}$) is $\gamma_1$. When the y-coordinate of the surrounding object 2000, which is the relative location, is "z+(W/2)", the collision risk ($\gamma_{index}$) is $\gamma_2$. Herein, the collision risk ($\gamma_{index}$) of $\gamma_1$ means the collision risk at a point in time when the vehicle 1000 collides with the surrounding object 2000 within a width (L) of a front portion in front of the vehicle 1000. The collision risk ($\gamma_{index}$) between $\gamma_1$ and $\gamma_2$ means the collision risk ($\gamma_{index}$) at a point in time when the collision between the vehicle 1000 and the surrounding object 2000 is predicted within the A-pillar width on the side of the vehicle 1000.

On the basis of the collision prediction information, the controller 120 may provide a warning to the outside of the vehicle 1000, or may provide control information for controlling the braking of the vehicle 1000 while providing a warning to the outside of the vehicle 1000. That is, on the basis of the collision prediction location ($y_{pred}$), the reciprocal ($TTC_{Radial}^{-1}$) of time to collision, and the collision risk ($\gamma_{index}$), the controller 120 may provide a warning to the surrounding object 2000, or may provide the control information for the controlling braking of the vehicle 1000 while providing a warning to the surrounding object 2000. Herein, the warning provided to the outside of the vehicle 1000 may include at least one of a horn or a headlight beam.

The controller 300 of the vehicle 1000 and the controller 120 of the collision warning apparatus 100 according to an exemplary embodiment of the present disclosure may be a processor (e.g., computer, microprocessor, CPU, ASIC, circuitry, logic circuits, etc.). Each of the controller 300 and the controller 120 may be implemented by a non-transitory memory storing, e.g., a program(s), software instructions reproducing algorithms, etc., which, when executed, performs various functions described hereinafter, and a processor configured to execute the program(s), software instructions reproducing algorithms, etc. Herein, the memory and the processor may be implemented as separate semiconductor circuits. Alternatively, the memory and the processor may be implemented as a single integrated semiconductor circuit. The processor may embody one or more processor(s). The controller 300 and the controller 120 may include a communication module that is a hardware device implemented by various electronic circuits, e.g., processor, transceiver, etc., to transmit and receive signals via wireless or wired connections.

As described above, the vehicle 1000 according to an embodiment of the present disclosure may provide an opportunity to avoid a collision by providing a warning to a pedestrian, thereby preventing a collision accident in advance.

Moreover, the vehicle 1000 may calculate the collision risk of the surrounding object 2000 and then may provide warnings classified depending on a collision risk. Accordingly, the vehicle 1000 may provide a collision avoidance system optimized for driving situations of a vehicle.

Besides, because the vehicle 1000 may reduce unnecessary braking action by analyzing collision risk, the vehicle 1000 may improve the fuel efficiency and may prevent sudden stops. Accordingly, the vehicle 1000 may improve the safety of a driver and passengers.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, embodiments of the present disclosure are not intended to limit the technical spirit of the present disclosure, but provided only for the illustrative purpose. The scope of protection of the present disclosure should be construed by the attached claims, and all equivalents thereof should be construed as being included within the scope of the present disclosure.

According to an embodiment of the present disclosure, a collision warning apparatus that may prevent collision accidents in advance by providing a warning to pedestrians and may provide a warning classified depending on a collision risk, and a vehicle including the same.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A collision warning apparatus of a vehicle, the apparatus comprising:
   an information acquisition device configured to obtain surrounding object information and vehicle information; and
   a controller configured to:
   generate collision prediction information of a surrounding object based on the surrounding object information and the vehicle information; and
   based on the collision prediction information, provide a warning to an outside of the vehicle or generate control information for controlling braking of the vehicle while providing the warning to the outside of the vehicle,
   wherein the collision prediction information includes a collision prediction location of the surrounding object, a time to collision of the surrounding object, and a collision risk of the surrounding object, and
   wherein the controller is further configured to:
   set a threshold range based on a relative location of the surrounding object, and
   predict the collision risk based on the collision prediction location, when the surrounding object is in danger of collision with the vehicle based on the threshold range,
   wherein the controller provides the warning to the outside of the vehicle or generates the control information for controlling the braking of the vehicle while providing the warning to the outside of the vehicle, when the collision prediction location is within the threshold range from the vehicle.

2. The apparatus of claim 1, wherein the surrounding object information includes the relative location of the surrounding object and a relative velocity of the surrounding object with respect to a location and a velocity of the vehicle, respectively, and
   wherein the vehicle information includes a size of the vehicle and an angular velocity of the vehicle.

3. The apparatus of claim 2, wherein the information acquisition device detects the surrounding object in front of the vehicle by using a vehicle front camera, and detects the relative location of the surrounding object and the relative velocity of the surrounding object by using a radar or a lidar.

4. The apparatus of claim 2, wherein the controller predicts the collision prediction location based on the relative location and the relative velocity, and predicts the time to collision based on the relative location and an angle between the vehicle and the surrounding object.

5. The apparatus of claim 1, wherein the controller generates control information for providing the warning to the outside of the vehicle, when the collision risk is less than a first value and a reciprocal of the time to collision exceeds a first threshold.

6. The apparatus of claim 1, wherein the controller generates the control information for controlling the braking of the vehicle to fully stop the vehicle, when the collision risk is less than a second value and a reciprocal of the time to collision exceeds a second threshold.

7. The apparatus of claim 1, wherein the controller generates the control information for controlling the braking of the vehicle while providing the warning to the outside of the vehicle, when the collision risk is greater than or equal to a second value and is less than a first value and a reciprocal of the time to collision exceeds a second threshold.

8. The apparatus of claim 1, wherein the warning provided to the outside of the vehicle includes at least one of a horn and a headlight beam.

9. A vehicle comprising:
   an interface configured to receive a warning mode of the vehicle;
   a collision warning apparatus configured to obtain surrounding object information and vehicle information and to generate collision prediction information of a surrounding object based on the surrounding object information and the vehicle information; and
   a vehicle controller configured to:
   based on the collision prediction information and the warning mode received through the interface,
   provide a warning to an outside of the vehicle; or
   control braking of the vehicle while providing the warning to the outside of the vehicle,
   wherein the collision prediction information includes a collision prediction location of the surrounding object, a time to collision of the surrounding object, and a collision risk of the surrounding object,
   wherein the collision warning apparatus is further configured to:
   set a threshold range based on a relative location of the surrounding object, and
   predict the collision risk based on the collision prediction location, when the surrounding object is in danger of collision with the vehicle based on the threshold range,
   wherein the surrounding object information includes the relative location of the surrounding object and a relative velocity of the surrounding object with respect to a location and a velocity of the vehicle, respectively,
   wherein the vehicle information includes a size of the vehicle and an angular velocity of the vehicle, and
   wherein the warning mode includes at least one of a warning time point, whether an external warning of the vehicle is present, or whether the vehicle is braked.

10. The vehicle of claim 9, wherein the collision warning apparatus predicts the collision prediction location based on the relative location and the relative velocity, and predicts the time to collision based on the relative location and an angle between the vehicle and the surrounding object.

11. The vehicle of claim 9, wherein the vehicle controller provides the warning to the outside of the vehicle or controls the braking of the vehicle while providing the warning to the outside of the vehicle, when the warning mode includes execution of an external warning of the vehicle and execution of the braking of the vehicle, and the collision prediction location is within the threshold range from the vehicle.

12. The vehicle of claim 11, wherein the vehicle controller provides the warning to the outside of the vehicle, when the collision risk is less than a first value and a reciprocal of the time to collision exceeds a first threshold.

13. The vehicle of claim 11, wherein the vehicle controller controls the braking of the vehicle to fully stop the vehicle, when the collision risk is less than a second value and a reciprocal of the time to collision exceeds a second threshold.

14. The vehicle of claim 11, wherein the vehicle controller brakes the vehicle while providing the warning to the outside of the vehicle, when the collision risk is greater than or equal to a second value and is less than a first value and a reciprocal of the time to collision exceeds a second threshold.

15. The vehicle of claim 9, wherein the warning provided to the outside of the vehicle includes at least one of a horn and a headlight beam.

16. A collision warning apparatus of a vehicle, the apparatus comprising:
   an information acquisition device configured to obtain information on the vehicle and a surrounding object; and
   a controller configured to:
   determine whether there is a collision risk between the vehicle and the surrounding object based on the obtained information on the vehicle and the surrounding object,
   provide a warning to an outside of the vehicle upon determining that there is a first collision risk between the vehicle and the surrounding object, and
   control braking of the vehicle to reduce a speed of the vehicle while providing the warning to the outside of the vehicle upon determining that there is a second collision risk between the vehicle and the surrounding object, which is greater than the first collision risk,
   wherein the information on the vehicle and the surrounding object includes a collision prediction location of the surrounding object, a time to collision of the surrounding object, and the collision risk of the surrounding object,
   wherein the controller generates control information for providing the warning to the outside of the vehicle, when the collision risk is less than a first value and a reciprocal of the time to collision exceeds a first threshold.

17. The apparatus of claim 16, wherein the controller is further configured to control the braking of the vehicle to fully stop the vehicle upon determining that there is a third collision risk between the vehicle and the surrounding object, which is greater than the second collision risk.

* * * * *